United States Patent [19]

Praschnik et al.

[11] Patent Number: 5,207,183

[45] Date of Patent: May 4, 1993

[54] FLEA-RID AND GROOMING APPARATUS AND METHODS

[76] Inventors: Martha Praschnik, 2340 NW. 41 St., Boca Raton, Fla. 33431; Marina Wasserman, Obligado 1563 6th Floor (1426); Ariel Lerer, Olleros 2344, 19th Floor Apt. C. (1426), both of Buenos Aires, Argentina

[21] Appl. No.: 802,896

[22] Filed: Dec. 6, 1991

[51] Int. Cl.⁵ .................. A01K 13/00; A01M 5/04
[52] U.S. Cl. ...................... 119/87; 119/156; 43/142
[58] Field of Search ............ 119/87, 156, 157, 83, 119/85, 91; 43/139, 142, 143, 134, 138; 15/22.3, 51, 99; 56/328

[56] References Cited

U.S. PATENT DOCUMENTS

| | | | |
|---|---|---|---|
| 921,143 | 5/1909 | Mylchreest | 119/85 |
| 1,335,441 | 3/1920 | Juricich | 119/85 |
| 1,921,064 | 8/1933 | Barker | 119/91 |
| 4,083,327 | 4/1978 | Dowdy | 119/85 |
| 4,279,095 | 7/1981 | Aasen | 43/139 |
| 4,485,583 | 12/1984 | Planty | 43/139 |
| 4,599,823 | 7/1986 | Lee | 119/156 |
| 4,630,329 | 12/1986 | Shores | 15/368 |
| 4,729,147 | 3/1988 | Armbruster | 15/314 |

Primary Examiner—John G. Weiss

[57] ABSTRACT

Apparatus and methods for removing fleas and other debris from a domestic animal's skin while grooming the animal's hair is disclosed. A pair of spaced wedge-shaped frame members contain a motor and a speed reducer there between which together serve to rotate an endless belt around front and rear members of the frame of the device. The endless belt is constructed of the hook material of a hook and hook fastener material arranged in alternate rows of convexly curved, semi-flexible but resilient raised portions. A cleaning brush removes the fleas and debris from the endless belt and deposits the same in a removable receptacle. The endless belt arrangement results in undulating motion of the belt along the hair and skin of an animal in performing the flea-rid cleaning and grooming functions.

14 Claims, 3 Drawing Sheets

FLEA-RID AND GROOMING APPARATUS AND METHODS

BACKGROUND OF THE INVENTION

1. Field of the Invention

This invention relates in general to the field of animal grooming apparatus and in particular to methods and apparatus for ridding animals of fleas and eggs while grooming the hair and skin of the animals.

2. Description of the Prior Art

Fleas on animals, such as household pets, are a significant problem. Fleas readily ingrain themselves within the hair and up against the skin of domestic animals such as dogs and cats. Once attached to domestic animals, a flea life cycle begins whereby the fleas bite the animal and draw nourishment therefrom and in due time, lay eggs at the base of the hair against the animals skin. The eggs may lie dormant for a considerable period of time or may hatch within a relatively short time such as ten days or so. Upon hatching, the eggs create new fleas which continue their life cycle and further increase the number of fleas on the animal. Needless to say, the biting by the fleas causes the animals to itch profusively for a long period of time even after the biting has occurred. The itching, of course, causes much discomfort to the animals. Such discomfort is further exacerbated if the animal is allergic to fleas which then can cause severe skin conditions such as rashes and loss or severe thinning of the animals hair.

The life cycle of fleas does not necessarily occur only on the body of an animal. For example, the life cycle can continue within the strands of a rug in a house or even in the grass outdoors. Once hatched, the fleas generated by eggs within the rug or grass simply wait for an animal to approach and then jump on the animal to further their life cycle.

Since most domestic animals at one time or another go outdoors there is a high likelihood that even an animal free of fleas will subsequently become infested with fleas due to the outdoor breeding grounds of the fleas. Considering then the diversity by which fleas may ultimately inhabit themselves upon an animals body it is very difficult if not impossible to completely rid an animal of fleas or prevent the animal from getting fleas. At best, the major weapon against fleas and the proliferation of the same is to attempt to control the environment both indoors and .outdoors where the animal may be expected to or actually frequents. Such well known flea control arrangements generally consist of chemicals applied both indoors and outdoors to attempt to kill the fleas and their eggs. It is well known however that such control arrangements are not one-hundred percent effective and sooner or later an animal will become inhabited with a number of fleas. Thus, the flea control arrangement must also include methods and apparatus to rid the animal itself of the fleas and their eggs.

One means in the prior art to rid domestic animals of fleas comprises a bathing solution or a flea soap which kills the fleas and the eggs on the body of the animal. Since an animal cannot be continuously bathed day in and day out the effect of such flea-ridding arrangement is temporary. Moreover, since the chemicals used to kill the fleas and the eggs must not be toxic to the animal especially since both dogs and cats continuously lick their various body parts for self-grooming purposes. Thus, chemical bathing arrangements to rid animals of fleas is only partially successful and for a relatively short period of time.

Still other prior art devices to rid animals of fleas comprise devices which utilize a vacuum source to suck the fleas up from the animals body and into an appropriate storage container. Many variations exist in the prior art of such vacuum assisted devices. It may be generally stated that the variations in this prior art are concerned with the head of the device which is used to pass through or over the animals hair in an attempt to reach the fleas on the animals skin at the base of the hair. Also in general, with these types of prior art devices, a vacuum motor and debris collection device are usually located away from a remote head between which is attached a flexible hose to direct the vacuumed fleas into the debris container. While somewhat effective, the vacuum type of prior art devices suffer from an inherent noise problem due to the motor and fan creating the vacuum. Most domestic animals are afraid of the vacuum noise and tend to run away as soon as the vacuum device is made known to the animal and turned on creating the vacuuming noise generated thereby. A further problem with the vacuum type of prior art devices is the amount of vacuum that is generated by the device. To great of a vacuum causes the animals skin to be sucked up against the head of the vacuum device while too little of the vacuum does not dislodge the fleas from the body of the animal and into the vacuum device.

Other variations in the vacuum type of prior art devices consist of bags or chambers whereby the fleas and the eggs are killed by a chemical within the bag or chamber.

In accordance with the above, there have been many attempts in the prior art to provide a flea-control arrangement for domestic animals. The relatively large number of prior art devices which utilize a mechanical means to rid a domestic animal of fleas and eggs is one indication of the fact that the prior art devices are not completely satisfactory for their intended purpose. It is to a mechanical type of device to rid an animal of fleas while grooming the animal to which the present invention pertains.

Accordingly, a primary goal of the present invention is to provide mechanical flea-ridding apparatus and methods for effectively removing fleas and eggs imbedded within the hair and against the skin of a domestic animal.

Another object or goal of the present invention is to provide mechanical flea-ridding apparatus and methods which does not cause panic or fear in the animal due to operation of the flea-ridding device itself.

Another object of the present invention is to provide mechanical flea-ridding apparatus and methods which grooms the animal's hair during the flea-ridding process.

Another object of the present invention is to provide mechanical flea-ridding apparatus and methods which does not use chemicals or vacuuming to perform its intended function.

Another object of the present invention is to provide mechanical flea-ridding apparatus and methods which is not bulky and easy to use by the person grooming and ridding the animal of fleas and eggs.

The above-stated objects as well as others which although not specifically stated, but are intended to be within the scope and breadth of the present invention, are accomplished by the present invention and will become apparent from the hereinafter setforth detailed description of the invention, drawings and the claims appended herewith.

SUMMARY OF THE INVENTION

The present invention, in accomplishing the above stated objectives, comprises methods and apparatus for ridding domestic animals of fleas and eggs while also grooming the hair of the animals utilizing a mechanical-capturing arrangement in conjunction with a brushing arrangement.

A belt arrangement, is driven by a motor which rotates the belt around a somewhat triangular or wedge-shaped frame with an apex or leading end portion of the wedge and a bottom flat portion of the belt being used in combination with belt movement and hand pushing to advance the apparatus through the hair and against the skin of an animal while mechanically capturing fleas and eggs and grooming the animal's hair. The fleas and eggs are captured by the action of the leading end and the bottom flat portion of the belt, which flat portion rests against the animals skin. Upon being captured, the flea eggs and debris are transported by the belt-system away from the animals body and past a container arrangement where a brush sweeps the captured flea eggs and debris into a collecting container. The cleansed belt then proceeds back toward the bottom flat portion of the device whereby the cycle may be repeated and additional flea eggs and debris may be captured and removed. The removal or capturing cycle thus continues until such time as the person utilizing the apparatus decides that the flea-ridding and grooming process is finished. Thereafter, the debris contained within the container arrangement is appropriately disposed of.

A unique feature of the inventive flea-ridding grooming and apparatus and methods comprises the construction of the belt which circulates around the triangular or wedge-shaped frame of the apparatus. The endless belt is made up of one or more strips of a hook material which comprises one part of a hook and hook fastening arrangement. The one or more strips of such hook material, comprising a plurality of individual hook spaced apart from each other, is attached to a belt base member in an arrangement whereby a wave pattern is created comprising a plurality of axially and transversely arranged, somewhat semi-circular, and semi-flexible but resilient raised portions along the length and width of the endless belt. The hook material is attached to the base belt member at a location between each of the plurality of raised portions. In one variation of the belting arrangement, side-by-side bands of the hook material, arranged in ascending and descending raised portions, or convex arcuate segments, are positioned off-set to each other whereby the convex arcuate segment heights on one side-by-side belt are positioned relative to the heights of the same on the belts on either side thereof such that an alternating high-low arrangement is created. By constructing the endless belt around the frame of the apparatus in this manner, a belting arrangement is created whereby a flat portion of the belt may be pressed against the animals skin while the belt is turning around the frame. The apparatus may then be pushed through the hair of the animal capturing and removing fleas, eggs and other debris. The semi-flexible but resilient ascending and descending raised portions of the belting arrangement, when pressed against the hair and skin of the animal, together with the belt motion and hand pushing of the device, results in a "massaging" action which effectively functions to pick up individual fleas and lodge the same within the confines of the hook material trapping the fleas and eggs therein and to brush the animal's hair removing any dirt or debris therefrom. As the belt moves away from the flat portion pressed against the animal's skin, it encounters a cleaning brush, which is also driven by the motor within the apparatus, which cleaning brush removes the fleas, eggs and debris trapped within the hook material and deposits the same into a debris collection container.

BRIEF DESCRIPTION OF THE DRAWINGS

Various other objects, advantages, and features of the invention will become apparent to those skilled in the art from the following discussion taken in conjunction with the following drawings, in which.

DESCRIPTION OF THE PREFERRED EMBODIMENTS

As required, detailed embodiments of the present invention are disclosed herein; however, it is to be understood that the disclosed embodiments are merely exemplerary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention showing the various figures are designated by the same referenced numerals.

Figure 1:
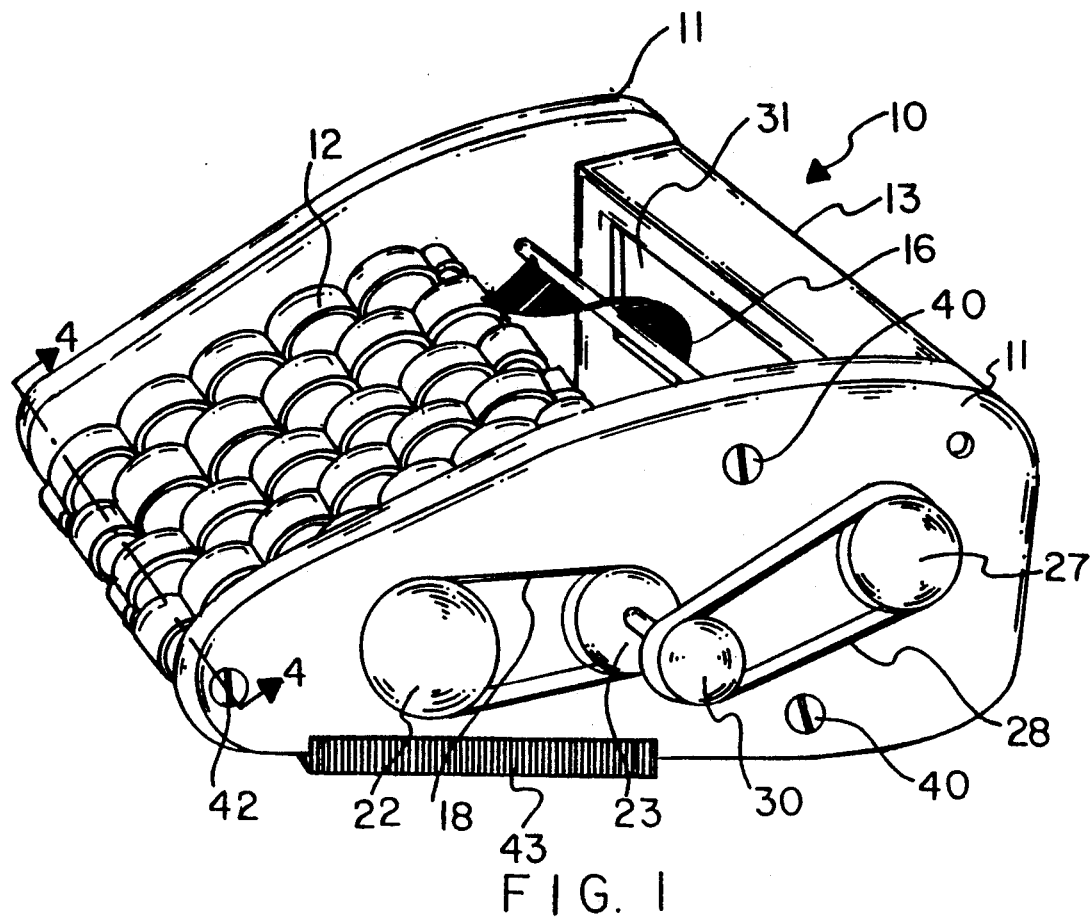
FIG. 1 is a frontal-side isometric view of the inventive apparatus illustrating in the overall shape of the same as well as some of the features thereof.
Figure 2:
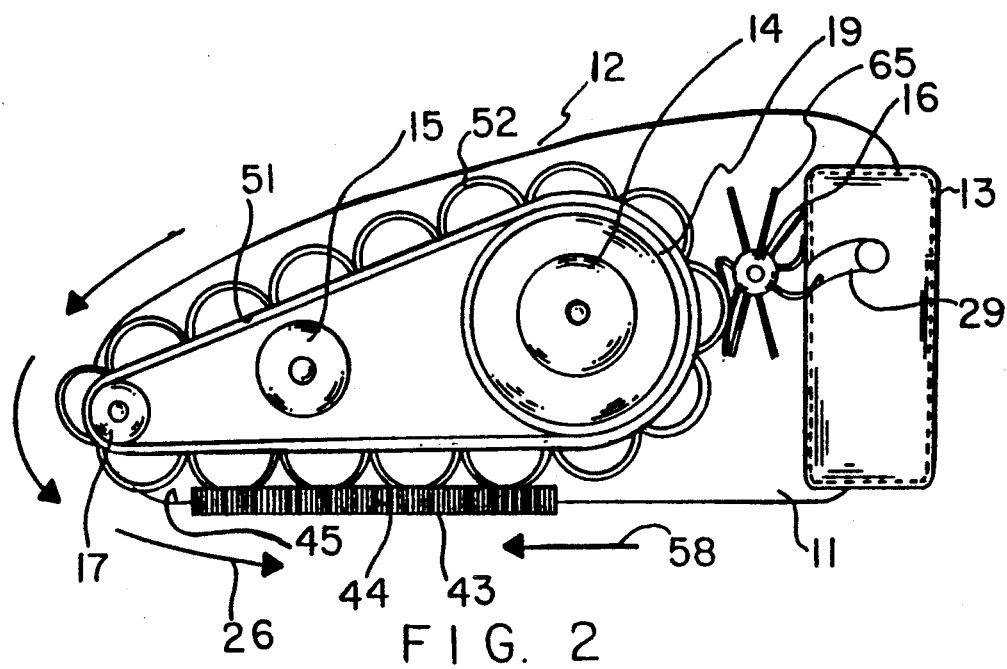
FIG. 2 is also a side elevation view of the inventive apparatus but with the outside frame being removed therefrom to illustrate the components therein.
Figure 3:
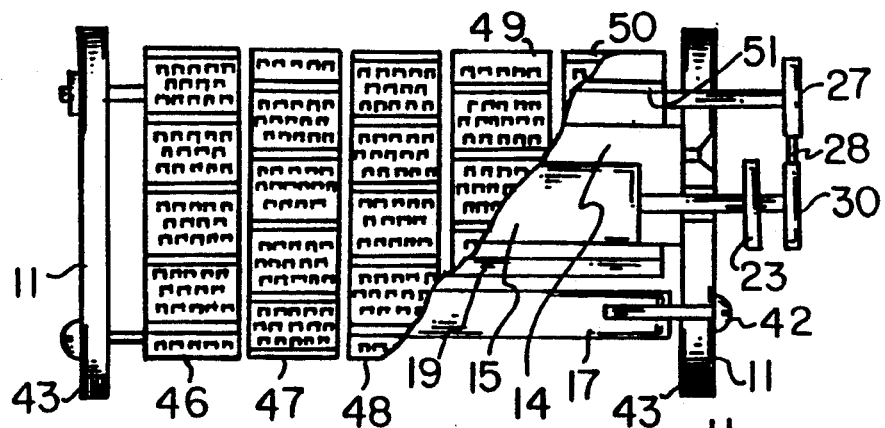
FIG. 3 is a front elevation view of the inventive apparatus of FIG. 1, partially in cross-section which illustrates a side by side belt arrangement of the inventive apparatus.
Figure 4:
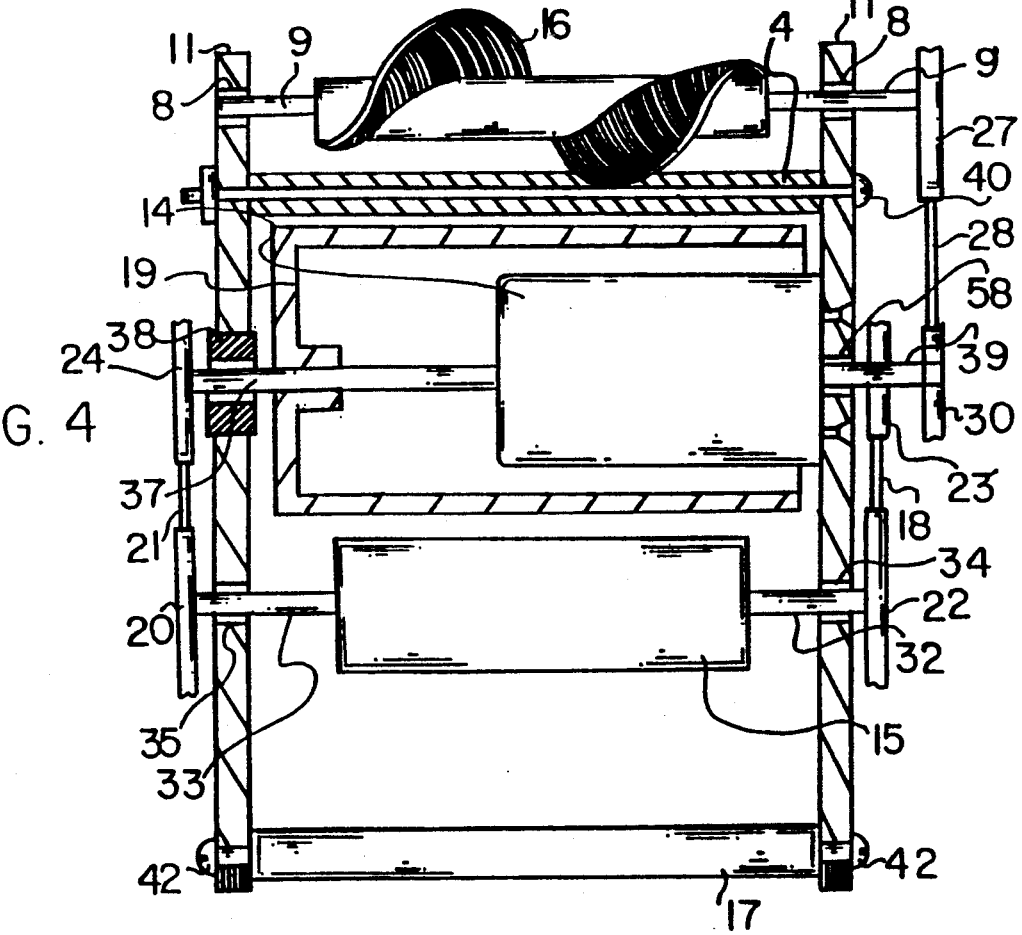
FIG. 4(a) is a cross-sectional view through the inventive apparatus taken along the line 4—4 of FIG. 1 illustrating a mechanical drive arrangement.
FIG. 4(b) is a partial view of another embodiment of the mechanical drive arrangement of FIG. 4(a).
Figure 4A:
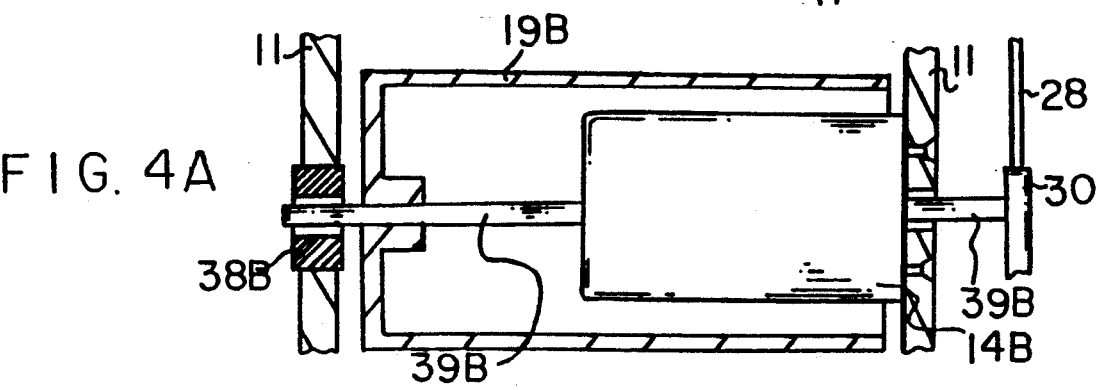

Reference is now made particularly to FIGS. 1 and 2 of the drawings wherein various overall details of the inventive flea-rid and grooming apparatus 10 are shown. Flea-rid and grooming apparatus 10 comprises a pair of frame members 11 separated from each other with each having a triangular or wedge-like shape with a relatively pointed apex end or leading end portion and a somewhat rounded back end. Between said spaced pair of frame members 11, is positioned an electrical drive motor 14 which drives a speed reducer 15 and a cleaning brush 16. A pulley 23 and belt arrangement 18 attached to motor 14 drives a pulley 22 attached to the axle of speed reducer 15 thereby driving speed reducer 15. In FIG. 4(a) it is seen that a pulley 20 of speed reducer 15 has attached thereto a belt 21 which drives pulley 24 which is attached to drive wheel 19. Drive wheel 19 in turn drives an endless belt arrangement 12. Cylindrical member 17 located at the apex end of the flea-rid and grooming apparatus 10 serves to allow the endless belt arrangement 12 to rotate in the direction of arrows 26 around cylindrical member 17 and drive wheel 19. Cylindrical member 17 may or may not be rotatable. Cylindrical member 17a in FIG. 3 is rotatable; cylindrical member 17 in FIG. 4 is non-rotatable. Speed reducer 15 in combination with the various pulley and belt arrangements function to reduce the speed of drive motor 14 such that the belt arrangement 12 moves at an approximate speed of 1-2 inches per second.

Drive motor 14, which may be conventionally attached to an electrical cord and plugged into an electrical receptacle of suitable voltage or may be battery operated (not shown), also rotates pulley 30 so which in turn drives pulley 27 by belt 28 which rotates cleaning brush 16. Cleaning brush 16 serves to cleanse any fleas, flea eggs, loose hair, and any other debris removed from the hair and skin of the animal from cleaning belt arrangement 12 and deposit the same into receptacle 13. Receptacle 13, comprising a hollow container, is suitably dimensioned and proportioned to fit between the rounded ends of frame members 11. A window-like opening 31 in receptacle 13 allows a portion of brush 16 to fit there within. Window opening 31 may be provided with a one-way flapper valve to prevent the fleas within container 13 from escaping through window 31 once they are captured and deposited into container 31. By using any well-known conventional method such as slot 29, or guide rails and clasp holes (not shown) debris receptacle 13 may be removably attached to frame members 11.

Speed reducer 15, includes axles 32 and 33 which are mounted for rotation within bushings 34 and 35 respectively in frame members 11. It is to be noted that axles 32 and 33 of speed reducer 15 rotate at different speeds in accordance with the action of speed reducer 15. An axil 9 of cleaning brush 16 is mounted for rotation within bushings 8, in frame members 11. Drive wheel 19 includes an axil 37 and a bushing 38 mounted to one of frame members 11. Drive motor 14 is concentrically mounted relative to drive wheel 19 but to the other of frame members 11. Drive shaft 39 of motor 14 passes through hole 58 in frame member 11. Pulleys 23 and 30 are fixedly mounted to drive shaft 39. A through bolt 40 and spacer member 41, in combination with cylindrical member 17 and screws 42, serve to proportionally space frame members 11.

It is envisioned that the inventive apparatus 10 may utilize an internally geared motor which rotates at a sufficiently low speed to not require the use of a speed reducer. In such an embodiment, a drive shaft 39(b) of motor 14(b) may be directly connected to a drive wheel 19(b) as shown in FIG. 4(b).

Frame members 11 also include an elongated brush arrangement 43 which serves to prevent self movement of the grooming apparatus 10 (by the movement of belt 12) and allow a person using the apparatus 10 to push it along the skin of the animal being groomed. The lower surface 44 of brush arrangement 43 extends slightly beyond the lowest surface 45 of belt arrangement 12 such that when the flea-rid and grooming apparatus 10 is positioned against the hair of the animal being groomed, the raised, convex arcuate segments 52 of belt 12 are positioned against the hair and the skin of the animal while lower surface 44 of brush arrangement 43 rests against the animal's hair and skin. Brush arrangements 43 thereby provide two static lines of support along bottom surface 44 that apply resistance against the movement of belt 12. In this manner, a person using the grooming apparatus 10, may push down on the apparatus 10 to rest the lower surface 44 of brush arrangements 43 against the animal's skin and hair and thereby prevent self-movement of the apparatus 10 due to the movement of belt 12 in the direction of arrows 26. Then, by applying a pushing force, in the direction of the arrow 58, the person using the apparatus 10 may advance the same along the animal's hair to groom and rid the animal of fleas. It is to be noted that the apparatus 10 may also be advanced in a direction opposite to that of arrow 58 to rid the animal of fleas and other debris. Also, that the belt 12 may be advanced in a direction opposite to that of arrow 26.

Referring now also to FIG. 3 of the drawings, it is seen that the belt arrangement 12 may comprise a plurality of side-by-side belts 46, 47, 48, 49, and 50 each of which is permanently affixed to a base belt member 51, the latter of which extends around cylindrical member 17 and drive wheel 19. Each belt 46 through 50 is individually attached to base belt member 51 in such a manner as to form an array of individual somewhat semi-circular, raised portions, or convex arcuate segments 52 around the length of each of the belts. As seen in FIGS. 2 and 3 of the drawings, each of the individual semi-circular, raised portions, or convex arcuate segments, 52 are offset with respect to the same on an adjacent belt. A small space may or may not exist between belts 46 through 50. In this manner, and as also shown in FIG. 3 of the drawings, the belt arrangement 12 consists of an alternating array of ascending and descending, somewhat semi-circular, and semi-flexible ascending and descending raised portions which extend around cylindrical member 17 and drive wheel 19. This arrangement causes an undulating effect in than continually different portions or segments 52 of the belt 12 act to brush and groom the animals hair and skin. Accordingly, the animals hair and skin are thoroughly cleaned along the length thereof from the skin up by the cleaning and grooming action of the inventive apparatus 10.

Figure 5A:
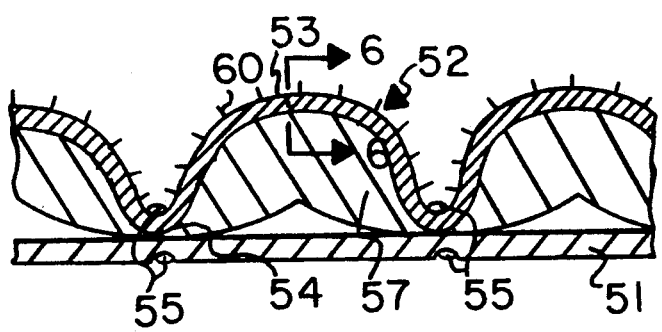
FIG. 5A depicts, in cross section, a flat belt made from a hook material attached to an endless belt member.
Figure 5B:
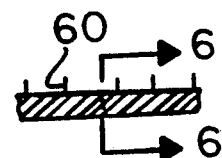
FIG. 5 is an enlarged side view of a portion of the belt arrangement used with the inventive apparatus illustrating one construction of the belt arrangement.

FIG. 5 of the drawings schematically illustrates a cross-sectional portion of a belt 46 through 50 as it is formed into a series of semi-flexible, somewhat semi-circular raised portions or convex, arcuate segments 52. Each semi-flexible, convex, arcuate segment 52 includes a crest or upper portion 53 and a lower base portion 54. An appropriate fastening arrangement 55 such as stitching 55 may be utilized to secure each of the lower base portions 54 of the individual convex arcuate segments 52 to the endless belt base member 51. Thus, in this manner, a plurality of semi-flexible, convex, arcuate segments 52 are serially and permanently formed along the length of each of the belts 46 through 50. As explained more fully hereinafter, the material from which each of the belts 46 through 50 are made may comprise the hook portion of a conventional hook and hook attachment material, and therefore, each of the convex, arcuate segments 52 are semi-flexible and resilient. To increase the stiffness and resiliently of individual convex, arcuate segments 52, a layer of resilient foam 57 may be permanently affixed and compressed between belts 46 through 50 and base belt member 51. The physical presence of the resilient foam 57 also prevents fleas from getting trapped under the arcuate segments 52.

A variation of the belting arrangement 12 may comprise utilization of a single flat belt 70 made from hook material as shown in FIG. 5A. That is, no convex, arcuate segments 52 are used. Further, a base belt member 51 is not required with this variation. While such variation is also effective and within the scope of the present invention, it is not as effective as the belt arrangement having convex, arcuate segments 52 which are alternately arranged as shown in the various figures of the drawings Another variation would utilize the convex, arcuate segments 52 but not offset relative to each other. Thus, there would exist rows of arcuate segments across the entire width of belt 12, which belt 12 may comprise a single endless belt.

Figures 6A, 6B, 6C:
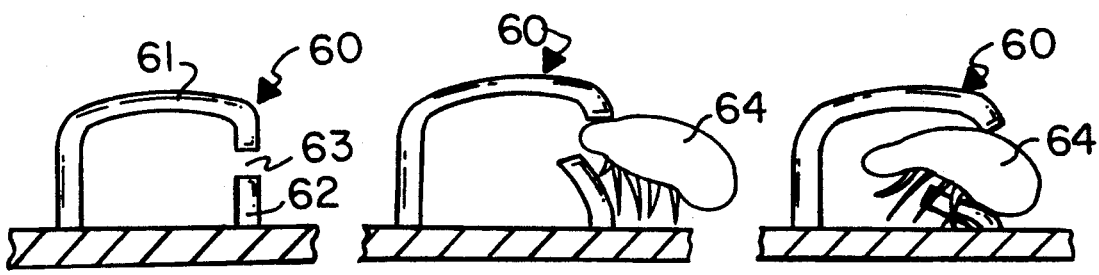
FIGS. 6a, 6b and 6c schematically illustrate the capturing of a flea by one of the hook arrangements of the hook material from which the belt is made; and, FIG. 7 schematically illustrates another manner of capturing a flea by the hook arrangements of the hook material from which the belt is made.

Each of the endless belts 46 through 50 are made from the hook portion of a conventional hook and hook fastener arrangement or other like material. In such fastener arrangements, a first component comprises a plurality of individual spaced-apart loop members, while a second separate component comprises a plurality of hook members. When pressed together, the hook and loop members intertwine and securely hold the two components together. Such hook and loop fastener arrangements are of course well known in the art with the most popular being marketed under the trademark VELCRO. An enlarged representation of one of the hook members 60 of such a hook material is shown in FIG. 6a of the drawings. A first portion of the individual hook member 60 comprises an inverted J portion 61 in combination with a straight portion 62, together forming an inverted U member with a space 63 between the unattached ends of portion 60 and 62. Typically, in the inventive flea-rid and grooming apparatus 10, the material from which each of the hook members 60 are made comprises a relatively stiff but flexible material such as nylon, or other synthetic material, or even metal. Although FIG. 6a only shows one hook member 60, it is to be noted that the entire upper surface of belts 46 through 50 are filled with a plurality of such hook members 60 which are spaced apart from each other and are arranged in a uniform pattern along said surface.

FIGS. 6a, 6b and 6c taken together schematically illustrate capturing of a flea by an individual hook member 60 of belt arrangement 12 as shown either in FIG. 5 or FIG. 5A. Due to the action of the flat belt on the convex, arcuate segments 52 of belt arrangement 12 as it is pushed against and brushes the hair and skin of the animal being rid of fleas coupled with the pushing of inventive apparatus 10 past the hair of the animal, a flea 64 or other piece of debris is encountered by at least one single hook member 60 which deforms as shown in FIG. 6b and thereby increases the size of the space 63 between the portions 61 and 62 of hook member 60. When the size of opening 63 is sufficiently large, a flea 64 or a body part thereof is able to fit within the enlarged opening and positions itself within the confines of the hook 60. After the flea 64 in whole or in part enters hook 60, the elastic deformation of the portions 61 and 62 of hook 60 attempt to revert to their former closed position as shown in FIG. 6c thereby effectively trapping the flea 64 or a part thereof there within. In the same manner, other bits of debris or solid matter are removed from the skin of an animal being groomed and caused to be deposited in part or in whole within and captured by a hook member 60 where it is prevented from escaping by the physical presence of adjacent hook members 60. As belt 12 moves in the direction of arrows 26, new and unencumbered hook members 60 pass by the animal's skin and hair ready to accept and capture any flea or debris at that particular location at that particular time.

Figure 7:
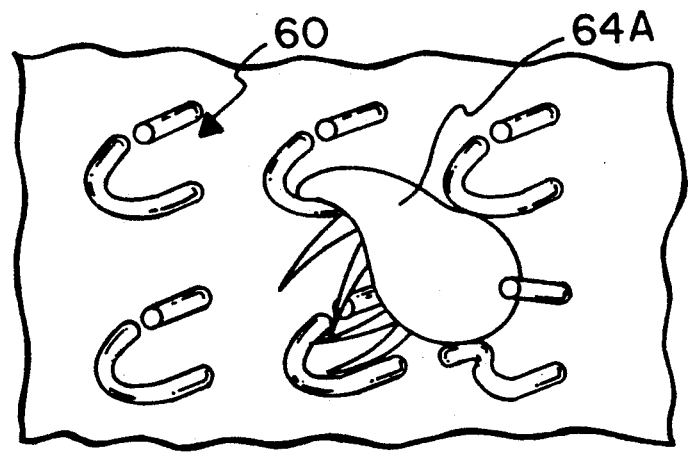

FIG. 7 illustrates another way the hook 60 capture a flea 64A which may be larger than the flea of 64. In this arrangement, it is seen that the larger flea 64A displaces or moves a number of individual loops 60 whereby the flea 64A is wedged therebetween and partially therewithin. The spring-like action of the displaced hooks 60 act in concert to contain the flea 64A until the brush 16 removes the flea 64A and deposits it within receptacle 13.

Once captured within an individual hook member 60, an item such as a flea 64 remains so captured until such time as the belt arrangement 12 encounters cleaning brush 16. Cleaning brush 16 rotates in a direction opposite to the direction of the travel of belt 12, and by the action of a plurality of relatively long bristles 65, the fleas, other debris or hairs attached to the individual hook members 60 are removed by the bristles 65 of brush 16 and by scraping along an edge of opening 31 of receptacle 13 the same is deposited within the confines of receptacle 13. Receptacle 13 may include a removable, flexible bag contained therewithin (not shown) which may provide for easy disposal of the fleas and debris removed by the inventive apparatus 10.

In prototype testing, it has been determined that the one effective way of utilizing the flea-rid and grooming apparatus 10 is by holding the inventive apparatus 10 in one hand while the other hand pushes the animals hair into a backwards position in a direction against the grain of the animal's hair. This exposes the animals skin where the hair is bent over backwards by the person's hand. Then, the apex or leading edge portion of the inventive apparatus 10 is positioned at the exposed location of the animal's skin. At this time, the belt arrangement 12 is moving in the direction of arrows 26 along the bottom portion of the device. Then, both hands are moved in the same direction along the animal's hair and skin in the direction of arrow 58 with the flat bottom section of belt 12 of the inventive device 10 continuously working on new hair and skin being exposed as the inventive apparatus 10 passes through and over the hair of the animal's body. The same procedure may be continuously repeated over different areas of the animal's body to completely remove any debris or fleas therefrom and at the same time cleanse the hair of the animal while removing dead of loose hairs therefrom. The end result is a animal which is rid of fleas and groomed in a superior manner than any previously known prior art device.

Another effective way of utilizing the flea-rid and grooming apparatus 10 is simply to advance the same in the direction of arrow 58 and thereby utilize device 10 itself to separate the hair on the animal in removing the fleas and other debris. Still another effective way of utilizing the flea-rid and grooming apparatus 10 is to move the apparatus 10 in a reverse direction to the grain of the animal's hair. This latter method is most effective with short-haired animals.

We claim:

1. Apparatus for grooming and removing fleas from the hair and skin of an animal comprising:
   a housing,
   first and second axles mounted to said housing with a space between said axles,
   a motor drivingly connected to said first axle,
   a belt extending around said first and second axles, said belt being driven there around by said motor, said belt comprising means for capturing a flea, debris, or other like items therewithin,
   said means for capturing a flea, debris, or other like items therewithin comprising a plurality of semi-flexible hooks each of said hooks substantially comprising an inverted "U" member with the ends thereof being attached to a base member, said "U" member having an opening along the length thereof.

2. The apparatus of claim 1 wherein said means for capturing a flea, debris, or other like items therewithin comprises a hook component of a two component, hook and loop, fastener arrangement.

3. The apparatus of claim 1 wherein said belt comprises a plurality of semi-flexible, convex, arcuate segments, serially arranged along the length of the belt.

4. The apparatus of claim 3 wherein said semi-flexible, convex, arcuate segments are resilient.

5. The apparatus of claim 3 wherein said belt comprises a plurality of side-by-side belts.

6. The apparatus of claim 5 wherein the convex, arcuate segments of each of said plurality of side-by-side belts are offset relative to those of an adjacent side-by-side belt.

7. The apparatus of claim 1 wherein said second axle is non-rotatable.

8. The apparatus of claim 1 wherein said second axle is rotatable.

9. The apparatus of claim 7 wherein the second axle includes a cylindrical member mounted therewith, said cylindrical member also being non-rotatable.

10. The apparatus of claim 7 wherein the second axle includes a rotatable cylindrical member mounted therewith.

11. The apparatus of claim 1 wherein said housing comprises a pair of co-extending plate members arranged parallel to each other with a space therebetween.

12. The apparatus of claim 11 wherein said co-extending plate members each have a lower edge which extends slightly beyond a lower surface of said belt.

13. The apparatus of claim 12 wherein said lower edge of said plate members each comprise a brush extending along said lower edge.

14. The apparatus of claim 1 including a receptacle removably mounted to said housing and a rotatable brush arranged relative to said belt and said receptacle for removing a captured flea, debris or other like items from said belt and depositing the same in said receptacle.

* * * * *